(No Model)

J. H. ASHBAUGH & C. L. WEBSTER.
DEVICE FOR FILLING FRUIT JARS.

No. 585,172. Patented June 29, 1897.

Witnesses:
Franck L. Ourand
Jos. L. Coombs

Inventors:
John H. Ashbaugh
Cheerer L. Webster
by Louis Bagger & Co.
Attorneys.

United States Patent Office.

JOHN H. ASHBAUGH AND CHEEVER L. WEBSTER, OF GALION, OHIO.

DEVICE FOR FILLING FRUIT-JARS.

SPECIFICATION forming part of Letters Patent No. 585,172, dated June 29, 1897.

Application filed July 6, 1896. Serial No. 598,192. (No model.)

*To all whom it may concern:*

Be it known that we, JOHN H. ASHBAUGH and CHEEVER L. WEBSTER, residents of Galion, in the county of Crawford and State of Ohio, have invented certain new and useful Improvements in Devices for Filling Fruit-Jars; and we do hereby declare that the following is a full, clear, and exact description of the invention, which will enable others skilled in the art to which it appertains to make and use the same, reference being had to the accompanying drawings, which form a part of this specification.

Our invention relates to an improved fruit-jar filler which is adapted to be secured onto a self-sealing fruit-jar, so as to allow the jar to be filled without liability of spilling the fruit or splashing the juice on the jar, and which may be detached from the can and have connected therewith a funnel or strainer for ordinary use.

The invention consists, essentially, of an open-bottom cup provided with a handle at one side and at the bottom with an inner downwardly-depending cylindrical flange adapted to be inserted in the mouth of a fruit-jar and with an outer screw-threaded flange adapted to engage with the screw-threads at the upper end of the jar, and said screw-threaded flange adapted to have connected therewith a funnel, as hereinafter fully described and claimed.

Figure 1:
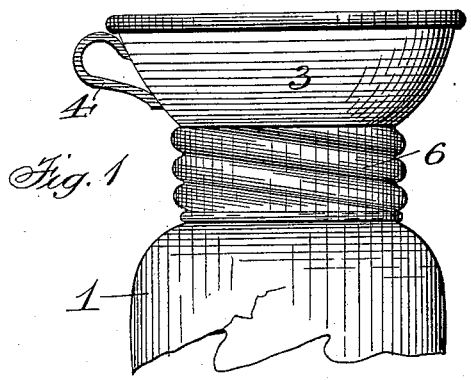
Figure 2:
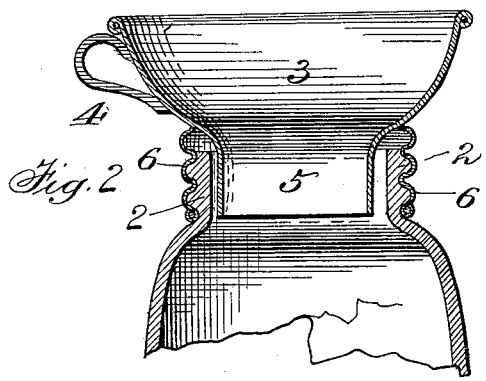
Figure 3:
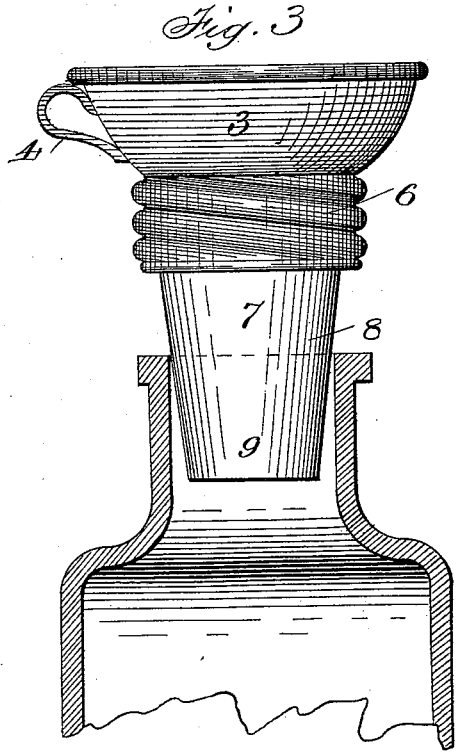
Figure 4:
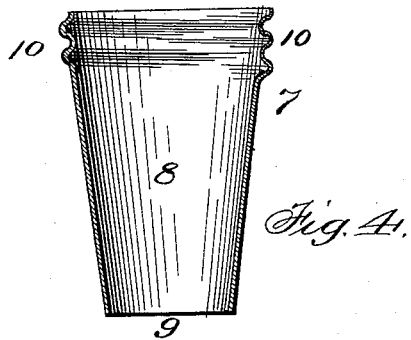
Figure 5:
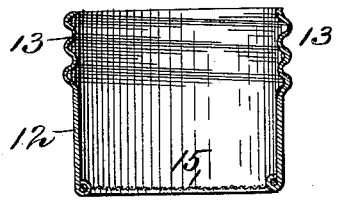

In the accompanying drawings, Figure 1 is an elevation showing the upper part of a self-sealing fruit-jar, showing our improved filling device applied thereto. Fig. 2 is a longitudinal sectional view of the same. Fig. 3 is a side elevation showing a funnel secured to the filling-cup for filling bottles and other similar purposes. Fig. 4 is a longitudinal sectional view of the funnel detached. Fig. 5 is a similar view of a strainer adapted to be secured to the filling-cup.

In the said drawings the reference-numeral 1 designates what is known as a "self-sealing fruit-jar"—that is, a fruit-jar having exterior screw-threads 2 at its mouth or upper end, with which is adapted to engage a correspondingly-threaded cover, (not shown,) but which may be of any ordinary or suitable construction.

The numeral 3 designates a filling-cup provided at one side with a handle 4 and open at its bottom and provided with a downwardly-depending cylindrical flange 5, which is inserted in the mouth of the jar. Outside of this flange is a screw-threaded flange or collar 6, which is screwed onto the upper end of the jar, thereby holding the filler securely in place and enabling the jar to be moved from place to place by means of the handle 4, which will be found very convenient when the jar is hot.

The numeral 7 designates a funnel comprising the conical portion 8, the spout 9, and a screw-threaded portion 10, adapted to engage with the threaded collar 6 when removed from the jar and serve as an ordinary funnel.

The numeral 12 designates a strainer consisting of a screw-threaded rim 13, adapted to be substituted for the funnel and engage with said threaded collar. This rim is provided with a perforated metal or wire-gauze bottom 15 and can be used for all purposes to which an ordinary strainer is applicable.

By our improved filling device the jar may be filled without liability of spilling or splashing the fruit or juice on the jar, and the device being securely held to the jar by means of the screw-threaded connection the jar can be readily handled, especially when hot, by means of the handle secured to the cup.

Having thus fully described our invention, what we claim is—

In combination with the open-bottom filling-cup having a handle at one side, a cylindrical flange at the lower end and a screw-threaded collar, of the detachable screw-threaded funnel engaging with said collar, substantially as described.

In testimony that we claim the foregoing as our own we have hereunto affixed our signatures in presence of two witnesses.

JOHN H. ASHBAUGH.
CHEEVER L. WEBSTER.

Witnesses:
EMANUEL STUMP,
T. F. DAILEY.